United States Patent [19]
Ozmeral

[11] Patent Number: 5,119,407
[45] Date of Patent: Jun. 2, 1992

[54] SAFETY ODOMETER APPARATUS FOR SEAT BELT USAGE

[76] Inventor: Cenan A. Ozmeral, 17 Tomahawk Trail, Sparta, N.J. 07871

[21] Appl. No.: 594,442

[22] Filed: Oct. 5, 1990

[51] Int. Cl.⁵ .......................................... G01C 22/00
[52] U.S. Cl. ..................................... 377/15; 377/24.1; 340/457.1
[58] Field of Search ............... 377/15, 24.1; 340/457.1, 522; 235/96, 97

[56] References Cited

U.S. PATENT DOCUMENTS

| | | | |
|---|---|---|---|
| 3,787,804 | 1/1974 | MacDonald | 340/522 |
| 3,863,209 | 1/1975 | Hollins | 340/457.1 |
| 3,866,167 | 2/1975 | Hirano | 340/522 |
| 4,354,097 | 10/1982 | Menager | 235/96 |
| 4,507,549 | 3/1985 | Secord | 235/96 |

*Primary Examiner*—John S. Heyman
*Attorney, Agent, or Firm*—Leon Gilden

[57] ABSTRACT

Apparatus wherein a primary automotive odometer includes a drive gear with a secondary odometer including a secondary gear with the secondary gear fixedly mounted to a solenoid ram wherein the solenoid ram is coupled to a solenoid. The solenoid is selectively actuated upon coupling of a seat belt arrangement to actuate the solenoid and effect engagement of the secondary gear relative to the gear of the primary odometer for indication of seat belt usage in relationship to automative usage in terms of miles traveled.

1 Claim, 2 Drawing Sheets

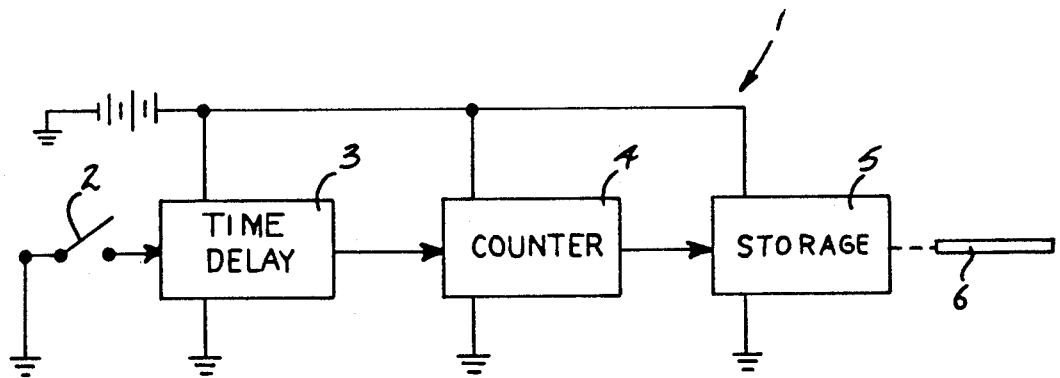
Fig 1
PRIOR ART
Fig 2
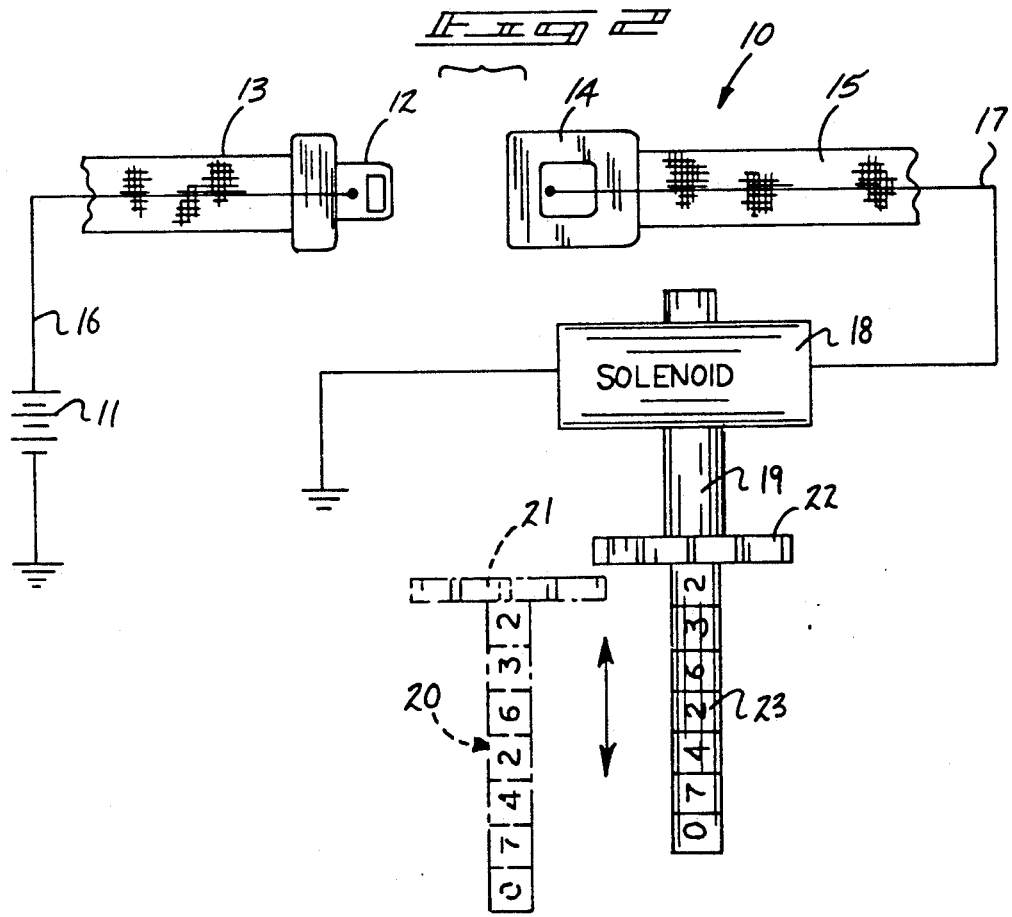

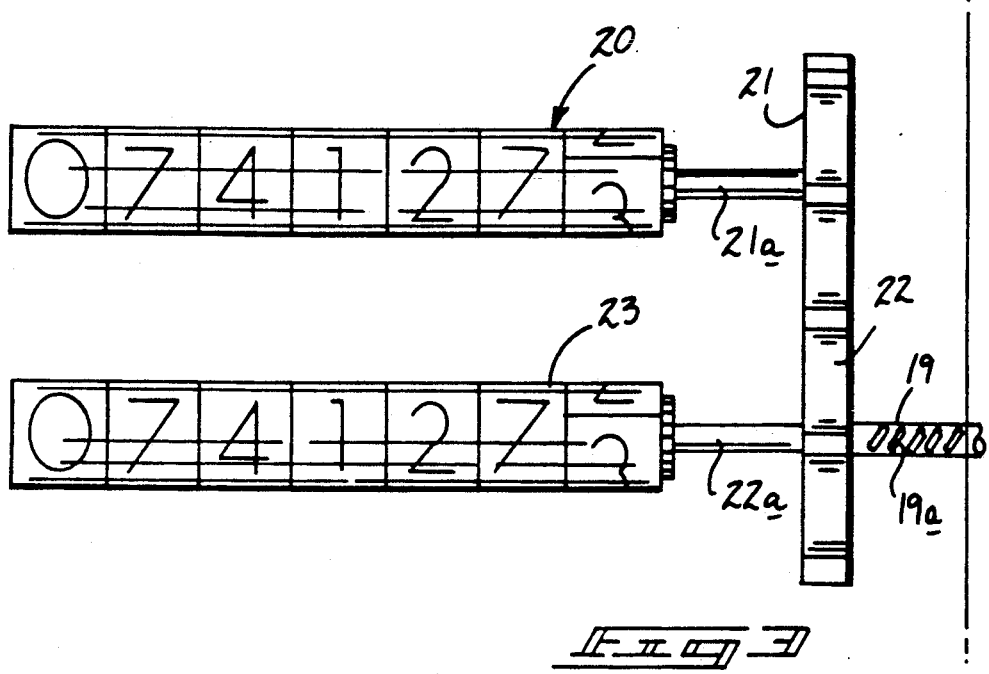
Fig. 3
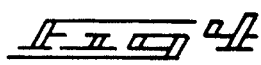
Fig. 4
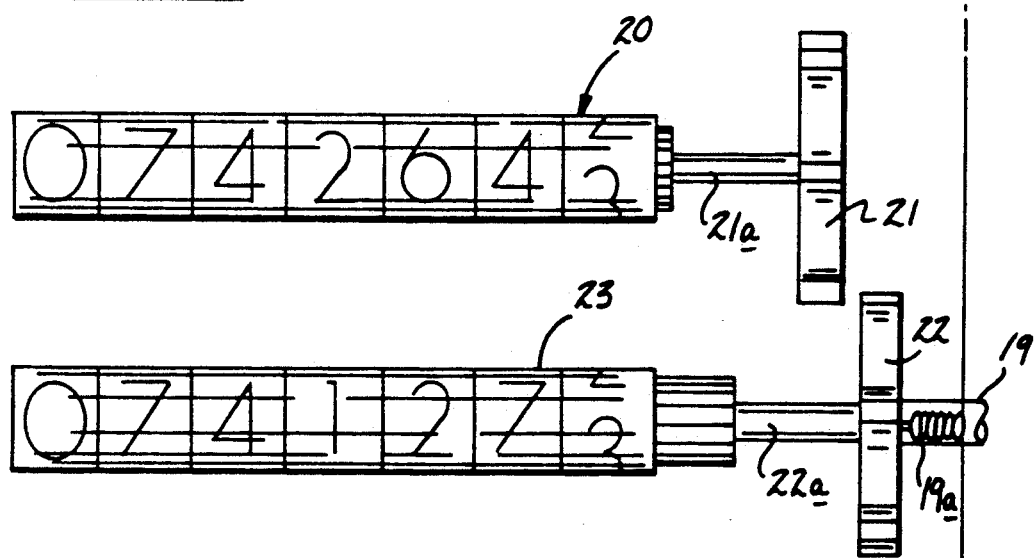

SAFETY ODOMETER APPARATUS FOR SEAT BELT USAGE

BACKGROUND OF THE INVENTION

1. Field of the Invention

The field of the invention relates to seat belt apparatus, and more particularly pertains to a new and improved safety odometer apparatus in cooperation with a seat belt arrangement to effect cooperation between a primary odometer and a secondary odometer for indication of seat belt usage.

2. Description of the Prior Art

Contemporary usage of seat belt organizations within an automotive environment have a proven history of reducing injury as a result of automotive impact and collision. Unfortunately such usage is not routinely enforceable and accordingly many unnecessary injuries occur due to neglect in usage of seat belts. To encourage seat belt usage, the instant invention attempts to overcome deficiencies of the prior art by coupling a secondary or safety odometer organization to a primary odometer organization of an automobile whereupon coupling engagement of a seat belt organization effects actuation of the safety odometer to indicate parallel usage of the safety odometer upon usage by the associated automobile. If desired the organization may be further coupled to an indicator light in the automobile such as in the dashboard to provide visual indication of coupling of the seat belt arrangement and actuation of the associated odometer. Examples of the prior art includes U.S. Pat. No. 4,667,336 to BEST wherein a seat belt member upon engagement actuates a counter recording each time the seat belt arrangement is utilized.

U.S. Pat. No. 3,886,167 to HIRANO sets forth an organization wherein ignition switch access is typically blocked prior to coupling engagement of an associated seat belt organization.

U.S. Pat. No. 3,904,884 to UOTA sets forth a seat belt operation detector to indicate seat belt usage upon an individual occupying an associated seat within the automobile.

U.S. Pat. No. 4,395,624 to WARTSKI sets forth an organization to process and store various information regarding operation of an associated automobile.

U.S. Pat. No. 3,934,123 to MAURER sets forth a plurality of counters and an interface circuit to determine or record a number of events the associated machine is performing.

As such, it may be appreciated that there continues to be a need for a new and improved safety odometer apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of seat belt organizations present in the prior art, the present invention provides a new and improved safety odometer apparatus in cooperation with a seat belt organization to effect coupling of a secondary odometer relative to an automotive primary odometer to indicate seat belt usage corresponding to automotive usage. As such, the general purpose of the present invention, which will be described subsequently in greater detail, is to provide a new and improved safety odometer apparatus which has all the advantages of the prior art seat belt organizations and none of the disadvantages.

To attain this, the safety odometer apparatus of the instant invention includes apparatus wherein a primary automotive odometer includes a drive gear with a secondary odometer including a secondary gear with the secondary gear fixedly mounted to a solenoid ram wherein the solenoid ram is coupled to a solenoid. The solenoid is selectively actuated upon coupling of a seat belt arrangement to actuate the solenoid and effect engagement of the secondary gear relative to the gear of the primary odometer for indication of seat belt usage in relationship to automotive usage in terms of miles traveled.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved safety odometer apparatus which has all the advantages of the prior art odometer apparatus and none of the disadvantages.

It is another object of the present invention to provide a new and improved safety odometer apparatus which may be easily and efficiently manufactured and marketed.

It is a further object of the present invention to provide a new and improved safety odometer apparatus which is of a durable and reliable construction.

An even further object of the present invention is to provide a new and improved safety odometer apparatus which is susceptible of a low cost of manufacture with regard to both materials and labor, and which accordingly is then susceptible of low prices of sale to the consuming public, thereby making such safety odometer apparatus economically available to the buying public.

Still yet another object of the present invention is to provide a new and improved safety odometer apparatus which provides in the apparatuses and methods of the prior art some of the advantages thereof, while simultaneously overcoming some of the disadvantages normally associated therewith.

Still another object of the present invention is to provide a new and improved safety odometer apparatus which may be compactly stored when not being utilized.

Yet another object of the present invention is to provide a new and improved safety odometer apparatus wherein the same effects coupling of a secondary odometer to a primary odometer upon seat belt usage to encourage and permit inspection of seat belt usage during automobile usage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a diagrammatic illustration of a prior art seat belt organization.

FIG. 2 is an diagrammatic illustration of the instant invention.

FIG. 3 is an orthographic view taken in elevation of the safety odometer apparatus in a second position.

FIG. 4 is an orthographic view taken in elevation of the safety odometer apparatus in a first displaced position.

DESCRIPTION OF THE PREFERRED EMBODIMENT

With reference now to the drawings, and in particular to FIGS. 1 to 4 thereof, a new and improved safety odometer apparatus embodying the principles and concepts of the present invention and generally designated by the reference numeral 10 will be described.

FIG. 1 illustrates a prior art seat belt arrangement wherein a switch 2 is closed upon engagement of opposing coupling members of a seat belt whereupon electrical energy is directed through a time delay 3 to effect actuation of a counter 4 to operatively effect counting of the actuation or closing of the seat belt switch 2. Such information is directed into a storage unit for subsequent imparting upon a driver identification card 6.

More specifically, the safety odometer apparatus 10 of the instant invention essentially comprises a battery member 11 coupled to a first seat belt member 13 and specifically to the seat belt clasp 12 of the first seat belt member 13. A first electrical transmission line 16 directs electrical energy from the battery 11 to the seat belt clasp 12 as illustrated. A second seat belt member 15 includes a seat belt buckle 14 to couplingly and selectively receive the seat belt clasp 12 with a second electrical transmission line 17 in electrical communication with the seat belt buckle 14. Upon the seat belt clasp 12 and the seat belt buckle 14 engaging, electrical current is directed to a solenoid 18. The solenoid 18 includes a ram 19 normally positioned or biased in a first displaced position as illustrated in FIGS. 2 and 4. A first odometer drive gear 21 is operatively mounted to a first odometer drive shaft 21a of an associated automotive or primary odometer dial 20. The first odometer drive gear 21 is rotatably mounted in association with the primary odometer dial 20. A secondary odometer dial 23 includes a second odometer drive gear 22 coupled to the second odometer dial 23 by a second odometer drive shaft 22a (see FIG. 4). Upon the solenoid 18 being actuated by the completion and directing of electrical energy through the second electrical transmission line 17, the ram 19 is displaced to overcome bias of an associated ram spring 19a to align the second odometer drive gear 22 relative to the first odometer drive gear 21 to effect coupling engagement therebetween and thereby effect operative rotation of the second odometer drive shaft 22a and the associated secondary odometer dial 23. The respective first and second odometer drive gears 21 and 22 are in a 1 to 1 ratio to match mileage indication of the primary odometer dial 20 with the secondary odometer dial 23 during use.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A safety odometer apparatus comprising in combination,
   a first seat belt means with the first seat belt means including a seat belt clasp, the seat belt clasp including a first electrical transmission line in electrical communication therewith, and
   a second seat belt means with the second seat belt means including a seat belt buckle wherein the seat belt buckle is in electrical communication with a second electrical transmission line to permit electrical communication between the first and second electrical transmission line upon securement of the seat belt clasp within the seat belt buckle, and
   a primary odometer wherein the primary odometer including a primary odometer drive gear rotatably mounted relative to the primary odometer, and
   a secondary odometer positioned in a spaced relationship relative to the primary odometer with the secondary odometer including a secondary odometer drive gear mounted cooperatively to the secondary odometer, and
   drive means for displacing the secondary odometer drive gear relative to the primary odometer drive gear in a first position and operatively coupling and aligning the secondary odometer drive gear relative to the primary odometer drive gear in a second position displaced relative to the first position, and including a battery member in electrical communication with seat belt clasp and the first electrical transmission line, and the drive means including a solenoid in electrical communication with the seat belt buckle and the second electrical transmission line to effect electrical communication with and actuation of the solenoid when the seat belt clasp is positioned within the seat belt buckle, and a ram member with said secondary odometer drive gear attached mounted to the solenoid being displaced to the second position for operatively engaging said primary odometer drive gear upon securement of the seat belt clasp within the seat belt buckle to thereby record the distance traveled with seat belt usage on said secondary odometer, and wherein the primary odometer drive gear and the secondary odometer drive gear define a 1 to 1 drive ratio, and including a spring member mounted within the ram to bias the ram and the secondary odometer drive gear in the first position.

* * * * *